(12) United States Patent
Koo

(10) Patent No.: US 8,103,409 B2
(45) Date of Patent: Jan. 24, 2012

(54) VEHICLE HEIGHT CONTROL APPARATUS USING DATA COMMUNICATION BETWEEN BRAKING CONTROLLER AND SUSPENSION CONTROLLER AND CONTROL METHOD THEREOF

(75) Inventor: Bon Gyeong Koo, Suwon-si (KR)

(73) Assignee: Mando Corporation, Pyeongtaek-si (KR)

( * ) Notice: Subject to any disclaimer, the term of this patent is extended or adjusted under 35 U.S.C. 154(b) by 297 days.

(21) Appl. No.: 12/420,297

(22) Filed: Apr. 8, 2009

(65) Prior Publication Data
US 2009/0254250 A1 Oct. 8, 2009

(30) Foreign Application Priority Data

Apr. 8, 2008 (KR) ........................ 10-2008-0032786

(51) Int. Cl.
*B60G 17/018* (2006.01)
(52) U.S. Cl. .......................................... 701/37; 701/38
(58) Field of Classification Search ............... 280/5.501, 280/5.502, 5.507, 6.154; 701/36, 37, 38
See application file for complete search history.

(56) References Cited

U.S. PATENT DOCUMENTS

| | | | |
|---|---|---|---|
| 4,998,782 A | 3/1991 | Thatcher et al. | |
| 7,136,730 B2 * | 11/2006 | Lu et al. | 701/36 |
| 7,650,215 B2 * | 1/2010 | Lu et al. | 701/70 |
| 2001/0008986 A1 * | 7/2001 | Brown et al. | 701/1 |
| 2001/0021885 A1 | 9/2001 | Schulke et al. | |
| 2002/0107620 A1 * | 8/2002 | Kim | 701/37 |
| 2002/0139599 A1 * | 10/2002 | Lu et al. | 180/282 |
| 2003/0130778 A1 * | 7/2003 | Hrovat et al. | 701/45 |
| 2003/0236603 A1 * | 12/2003 | Lu | 701/37 |
| 2004/0099044 A1 | 5/2004 | Streit et al. | |
| 2005/0029754 A1 * | 2/2005 | Ueno et al. | 280/5.502 |
| 2005/0090956 A1 * | 4/2005 | Ogawa | 701/37 |
| 2005/0149240 A1 * | 7/2005 | Tseng et al. | 701/38 |
| 2006/0267750 A1 * | 11/2006 | Lu et al. | 340/440 |
| 2007/0021886 A1 * | 1/2007 | Miyajima | 701/37 |
| 2007/0106443 A1 * | 5/2007 | Lu | 701/70 |

FOREIGN PATENT DOCUMENTS

| | | | |
|---|---|---|---|
| JP | 4145323 A | 5/1992 | |
| JP | 5050823 A | 3/1993 | |
| JP | 11334336 A | 12/1999 | |

* cited by examiner

*Primary Examiner* — Toan To
(74) *Attorney, Agent, or Firm* — McDermott Will & Emery LLP

(57) ABSTRACT

A vehicle height control apparatus includes a suspension controller for controlling vehicle height, a lateral acceleration sensor, a braking controller determining a road surface condition on the basis of a difference between a lateral acceleration measured by the lateral acceleration sensor and a lateral acceleration calculated using a vehicle speed and a steering angle, the braking controller determining vehicle height information to be reflected in the suspension controller on the basis of the measured lateral acceleration and a roll angle presumed on the basis of the determined road surface condition and the measured lateral acceleration, and an interface unit performing data communication between the braking controller and the suspension controller.

8 Claims, 6 Drawing Sheets

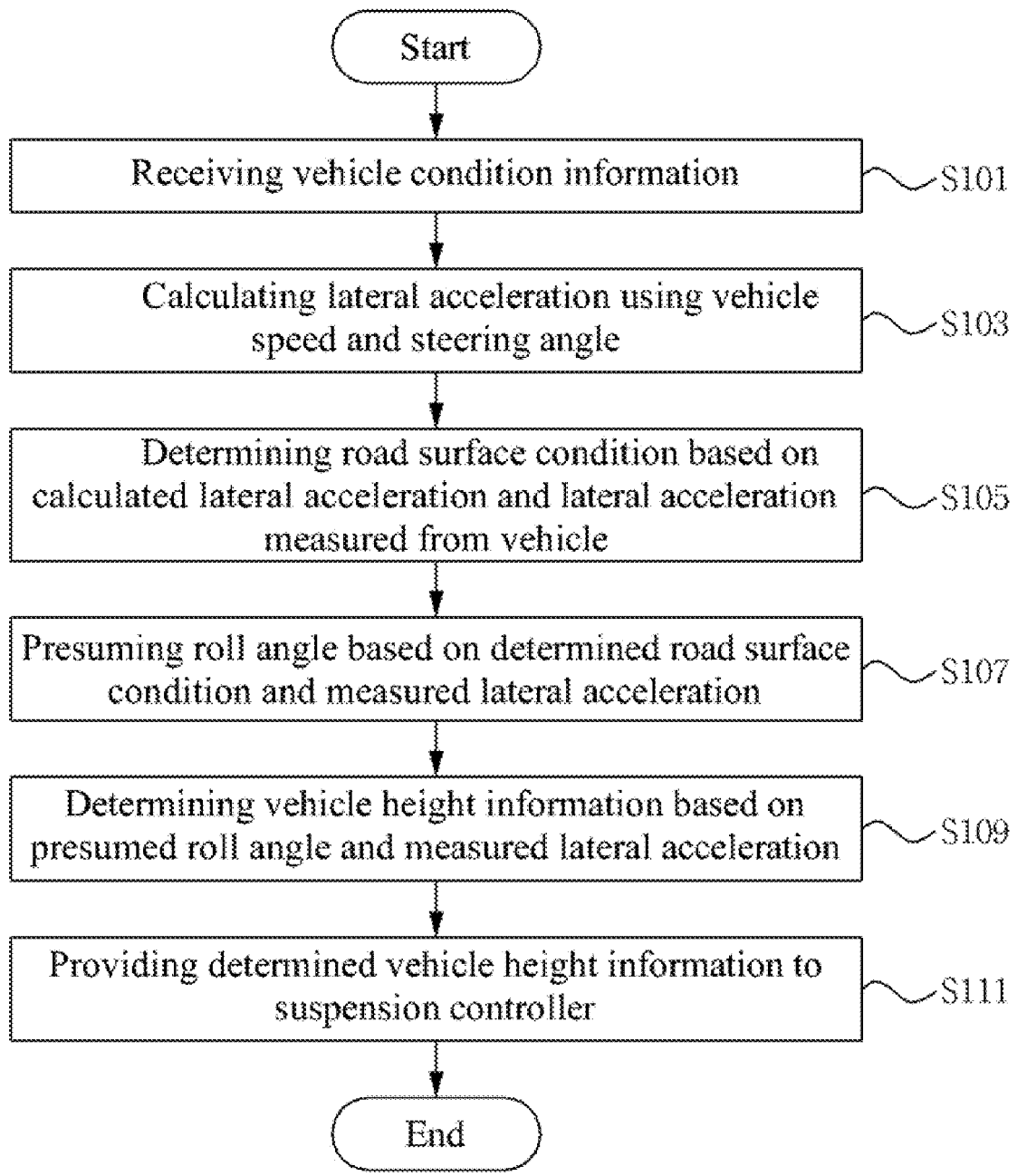

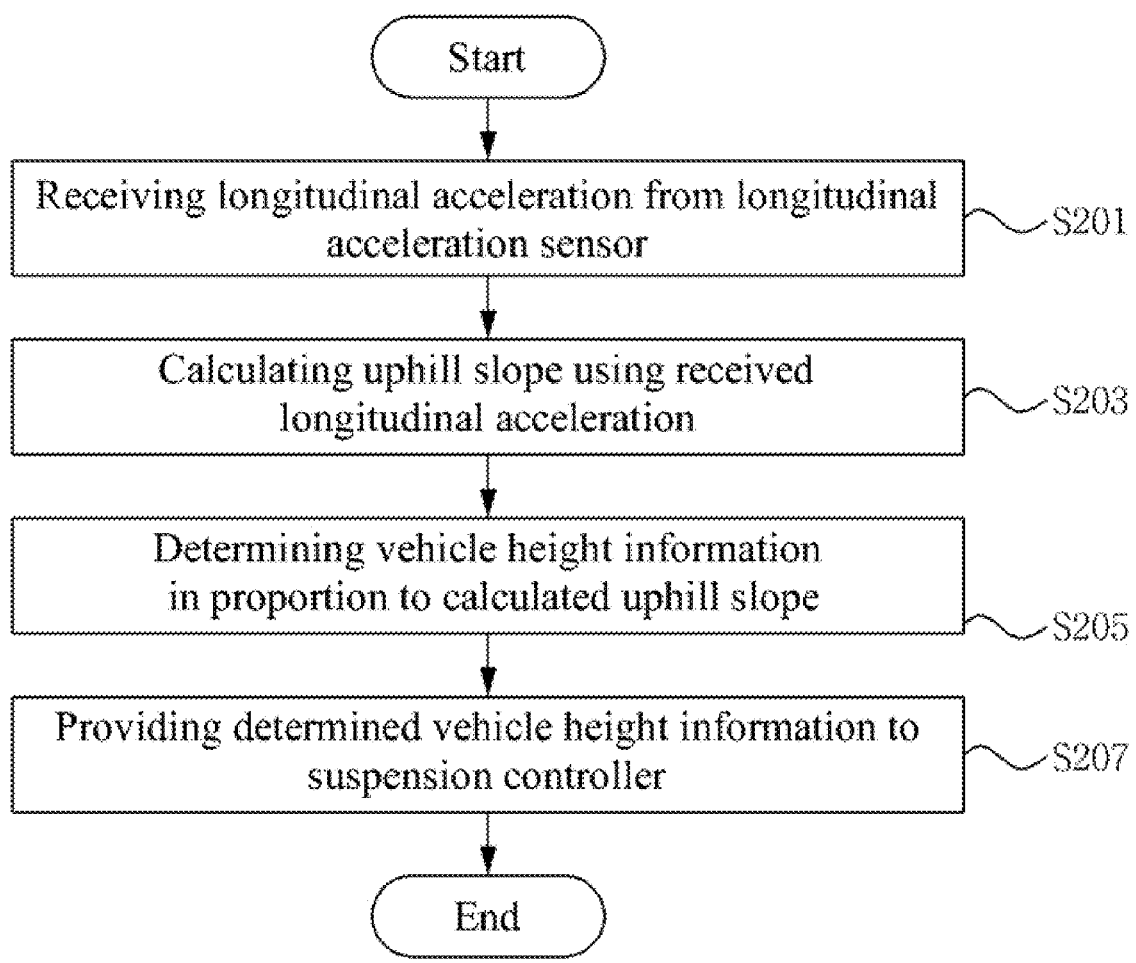

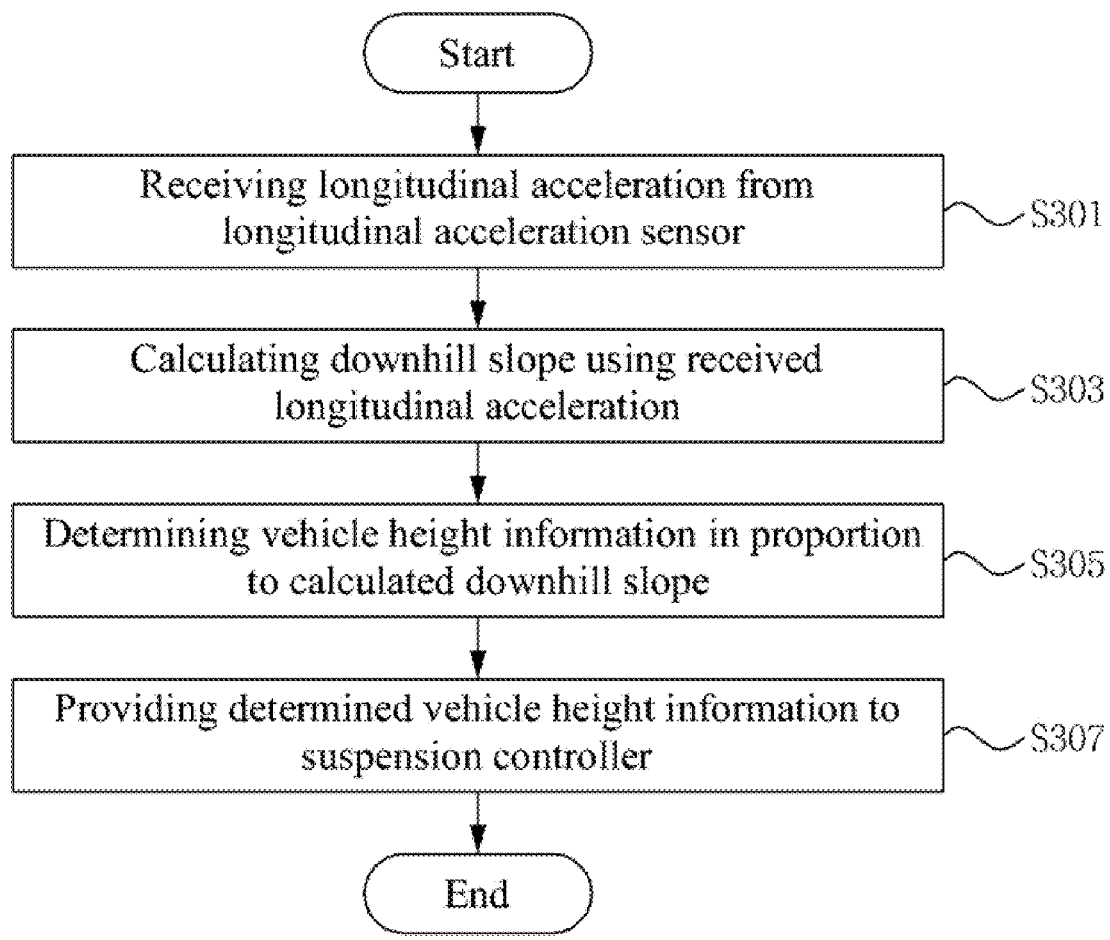

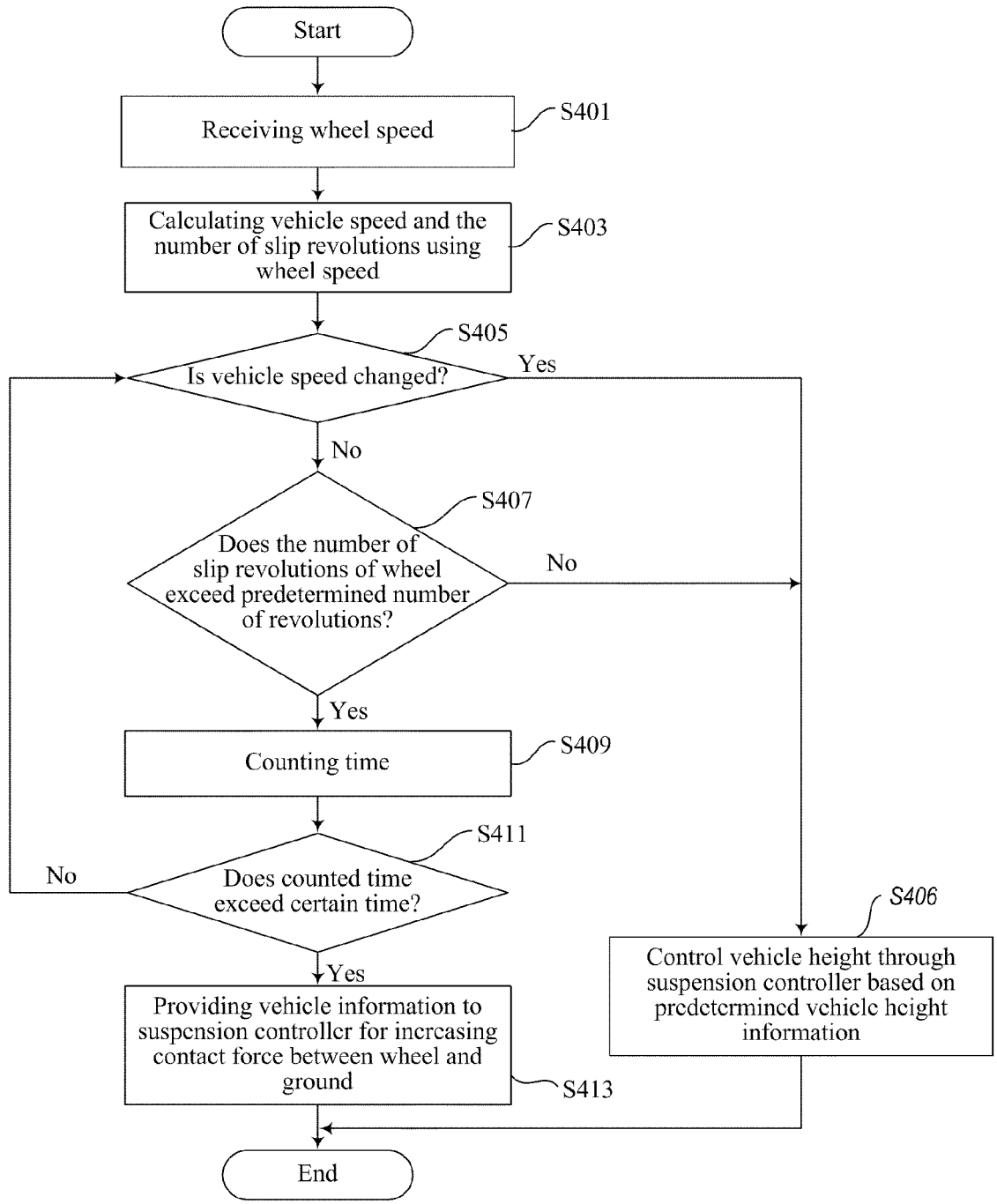

VEHICLE HEIGHT CONTROL APPARATUS USING DATA COMMUNICATION BETWEEN BRAKING CONTROLLER AND SUSPENSION CONTROLLER AND CONTROL METHOD THEREOF

BACKGROUND

1. Technical Field

The present disclosure relates to a vehicle height control apparatus and a control method thereof, and more particularly, to a vehicle height control apparatus wherein vehicle height information determined in a braking controller through cooperative control of the braking controller and a suspension controller is provided to the suspension controller via an interface unit to thereby enhance the acceleration performance and cornering stability of a vehicle when the vehicle is driven on an uphill road, a downhill road and an uneven road such as a puddle, and a control method of the apparatus.

2. Description of the Related Art

In general, as an electronic controller for a vehicle, a braking controller, a suspension controller and the like have been developed and contributed much to performance and stability of the vehicle.

Here, the braking controller receives signals of wheel speed sensors, a steering angle sensor, a brake pressure sensor, a yaw rate sensor and a lateral acceleration sensor to thereby control a vehicle and the suspension controller receives signals of vehicle height sensors, vehicle height control switches, door switches, a reservoir pressure sensor and a vehicle speed sensor to thereby control a vehicle. In particular, the braking controller considering driving characteristics of wheels secures performance on a slippery road and the like through traction control.

In such an electronic controller for a vehicle, the braking controller and the suspension controller individually perform the control, so that when a vehicle is driven on an uphill or slippery road, slop and/or friction force of a road surface cause the vehicle not to be driven on an uphill road and/or slippery road.

In particular, in a case where a driving wheel of a vehicle is fallen into a puddle, since contact or friction force between the driving wheel and a road surface is reduced, the vehicle cannot get out of the puddle only by the control of the braking controller without assistance of the suspension controller, so that the acceleration performance of the vehicle is restricted.

BRIEF SUMMARY

An object of embodiments of the present disclosure is to provide a vehicle height control apparatus, wherein a braking controller and a suspension controller communicate with each other to perform cooperative control thereof, thereby enhancing the acceleration performance and cornering stability of a vehicle when a vehicle is driven on an uphill road, a downhill road and an uneven road surface such as a puddle, and a control method of the apparatus.

A vehicle height control apparatus according to an embodiment for achieving the objects includes a suspension controller for controlling vehicle height; a lateral acceleration sensor; a braking controller determining a road surface condition on the basis of a difference between a lateral acceleration measured by the lateral acceleration sensor and a lateral acceleration calculated using a vehicle speed and a steering angle, the braking controller determining vehicle height information to be reflected in the suspension controller on the basis of the measured lateral acceleration and a roll angle presumed on the basis of the determined road surface condition and the measured lateral acceleration; and an interface unit performing data communication between the braking controller and the suspension controller. Here, when a vehicle turns, a vehicle body is inclined outside of a corner and this phenomenon is referred to as "roll" and the amount of inclination is referred to as a "roll angle."

Preferably, the braking controller may provide the vehicle height information to the suspension controller via the interface unit, wherein the vehicle height information is determined to lower the height at an inner side of a vehicle with respect to a vehicle turning direction and to raise the height at an outer side of the vehicle with respect thereto in proportion to the measured lateral acceleration and the presumed roll angle.

Also, a vehicle height control apparatus according to an embodiment includes a suspension controller for controlling vehicle height; a longitudinal acceleration sensor; a braking controller calculating an uphill or downhill slope using the longitudinal sensor, the braking controller determining vehicle height information to be reflected in the suspension controller in proportion to the calculated uphill or downhill slope; and an interface unit performing data communication between the braking controller and the suspension controller.

In this embodiment, the vehicle height information to be reflected in the suspension controller may allow the vehicle height at rear wheels to raise and the vehicle height at front wheels to lower when a vehicle is driven on an uphill road and allows the vehicle height at the rear wheels to lower and the vehicle height at the front wheels to raise when the vehicle is driven on a downhill road.

Further, a vehicle height control apparatus according to an embodiment includes a suspension controller for controlling vehicle height; a braking controller determining whether a vehicle speed is changed or not, and accordingly, determining vehicle height information to be reflected in the suspension controller so that contact force between a wheel and the ground is increased if the number of slip revolutions of the wheel exceeds a predetermined number of revolutions and a slip state is maintained for a certain time when the vehicle speed is not changed; and an interface unit performing data communication between the braking controller and the suspension controller.

A control method of the vehicle height control apparatus according to an embodiment includes the steps of: calculating, by the braking controller, a lateral acceleration using a vehicle speed and a steering angle when a vehicle turns; determining, by the braking controller, a road surface condition on the basis of a difference between the calculated lateral acceleration and a lateral acceleration measured by a lateral acceleration sensor; presuming, by the braking controller, a roll angle on the basis of the determined road surface condition and the lateral acceleration measured by the lateral acceleration sensor; determining, by the braking controller, vehicle height information to be reflected in the suspension controller on the basis of the presumed roll angle and the lateral acceleration measured by the lateral acceleration sensor; and providing, by the braking controller, the determined vehicle height information to the suspension controller via the interface unit.

Also, a control method of the vehicle height control apparatus according to one embodiment includes the steps of: calculating, by the braking controller, an uphill or downhill slope using a longitudinal acceleration sensor when a vehicle is driven on a sloping road; determining, by the braking controller, vehicle height information to be reflected in the suspension controller in proportion to the calculated uphill or downhill slope; and providing, by the braking controller, the determined vehicle height information to the suspension controller via the interface unit.

Further, a control method of the apparatus for controlling according to one embodiment includes the steps of: receiving, by the braking controller, a wheel speed from a wheel speed sensor when a vehicle wheel slips; calculating, by the braking controller, a vehicle speed and the number of slip revolutions of the wheel using the wheel speed; determining, by the braking controller, whether the calculated vehicle speed is changed or not; if the vehicle speed is not changed as a result of the above determination, determining, by the braking controller, whether the calculated number of slip revolutions of the wheel exceeds a predetermined number of revolutions; if the number of slip revolutions of the wheel exceeds the predetermined number of revolutions as a result of the above determination, determining, by the braking controller, vehicle height information to be reflected in the suspension controller to increase contact force between the wheel and the ground; and providing, by the braking controller, the determined vehicle height information to the suspension controller via the interface unit.

In one aspect before the step of determining the vehicle height information, the method may further include the steps of: if the number of slip revolutions of the wheel exceeds the predetermined number of revolutions, counting a time by the braking controller; and determining, by the braking controller, whether the counted time exceeds a certain time or not.

BRIEF DESCRIPTION OF THE SEVERAL VIEWS OF THE DRAWINGS

FIG. 3 is a flow chart for illustrating a control method of the vehicle height control apparatus according to one embodiment;

FIG. 4 is a flow chart for illustrating a control method of the vehicle height control apparatus when a vehicle is driven on an uphill road according to one embodiment;

FIG. 5 is a flow chart for illustrating a control method of the vehicle height control apparatus when a vehicle is driven on a downhill road according to one embodiment; and FIG. 6 is a flow chart for illustrating a control method of the vehicle height control apparatus when a vehicle is driven on an uneven road surface such as a puddle according to one embodiment.

DETAILED DESCRIPTION

Hereinafter, some embodiments will be described in more detail with reference to the accompanying drawings.

Figure 1:
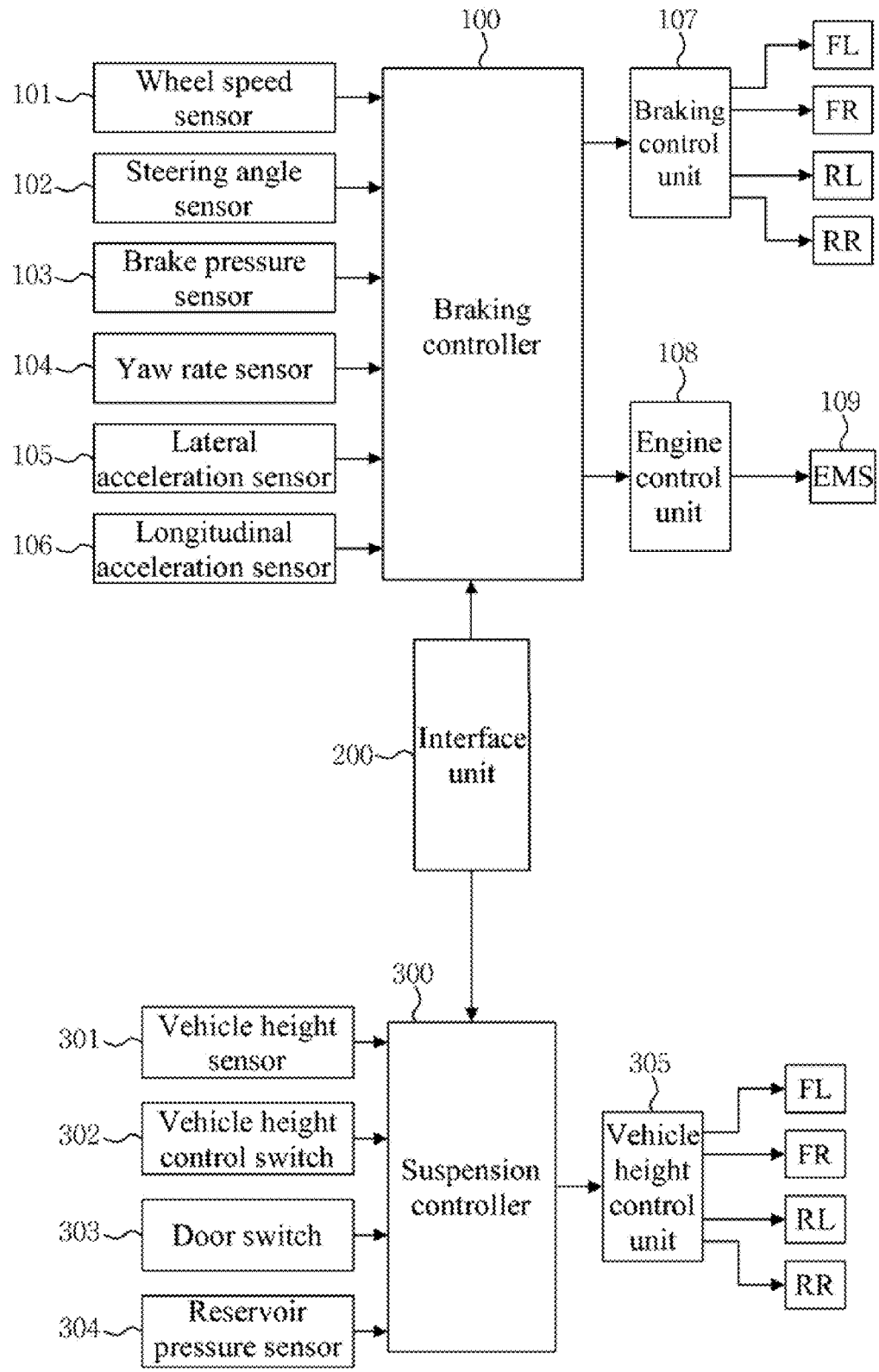
FIG. 1 is a block diagram schematically illustrating a vehicle height control apparatus according to an embodiment.
Figure 2:
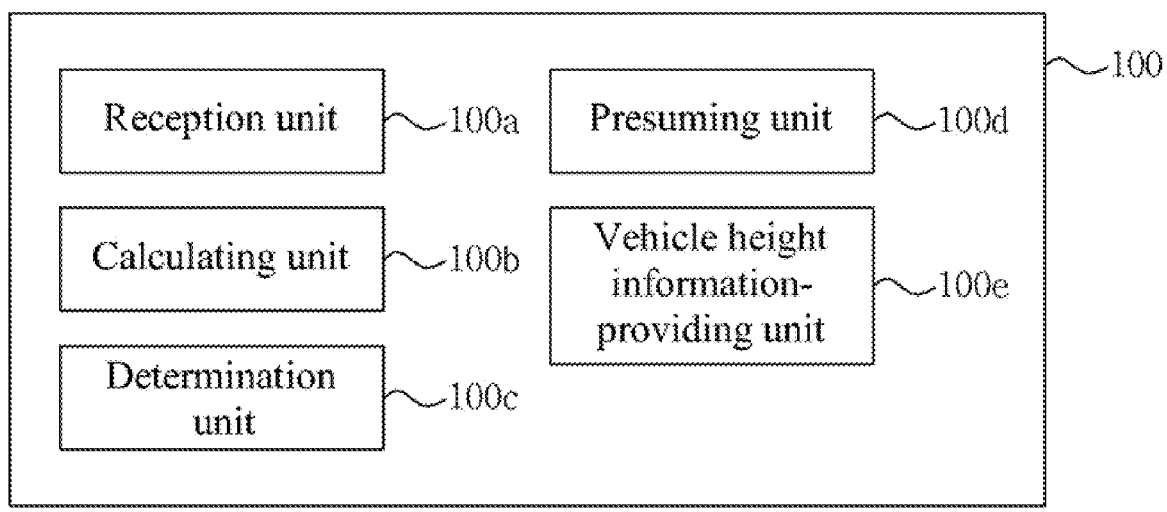
FIG. 2 is a block diagram schematically illustrating a braking controller shown in FIG. 1.

FIG. 1 is a block diagram for illustrating a vehicle height control apparatus according to an embodiment and FIG. 2 is a block diagram for illustrating a braking controller shown in FIG. 1 according to one embodiment.

Referring to FIG. 1, a vehicle height control apparatus includes a braking controller 100, a suspension controller 300 and an interface unit 200 performing communication between the braking controller 100 and the suspension controller 300. The interface unit 200 includes a controller area network (CAN). In addition, the vehicle height control apparatus according to one embodiment may further include a display unit (not shown) for displaying vehicle condition information.

The braking controller 100 receives signals from at least one of wheel speed sensors 101, a steering angle sensor 102, brake pressure sensors 103, a yaw rate sensor 104, a lateral acceleration sensor 105 and a longitudinal acceleration sensor 106 to control a braking control unit 107 and an engine control unit 108. The braking control unit 107 adjusts braking pressure of each wheel, and the engine control unit 108 adjusts torque of an engine and provides it to an engine management system (EMS) 109.

The suspension controller 300 receives signals from at least one of vehicle height sensors 301, vehicle height control switches 302, door switches 303 and a reservoir pressure sensor 304 to control a vehicle height control unit 305. When a vehicle is driven on a normal road, in general, the suspension controller 300 can adjust the vehicle height using the vehicle height control switches 302 based on the vehicle height information received from the vehicle height sensors 301 to increase a stability of the vehicle.

In particular, the suspension controller 300 controls the vehicle height based on the vehicle height information received from the braking controller 100 via the interface unit 200.

The braking controller 100 according to one embodiment calculates a lateral acceleration using the vehicle speed and the steering angle measured by the steering angle sensor 102, and determines a road surface condition on the basis of a difference between the calculated lateral acceleration and the lateral acceleration measured from the vehicle, for example, the lateral acceleration measured by the lateral acceleration sensor 105. In addition, the braking controller 100 presumes a roll angle on the basis of the determined road surface condition and the lateral acceleration measured by the lateral acceleration sensor 105 and allows the suspension controller 300 to control the vehicle height on the basis of the presumed roll angle and the lateral acceleration measured by the lateral acceleration sensor 105. In other words, the braking controller 100 provides the vehicle height information, which is determined on the basis of the roll angle and the lateral acceleration, to the suspension controller 300 via the interface unit 200. Then, the suspension controller 300 controls the vehicle height control unit 305 to adjust the vehicle height according to the vehicle height information transmitted via the interface unit 200. As a result, it is possible to secure cornering stability of the vehicle.

Further, the braking controller 100 calculates an uphill slope using the longitudinal acceleration sensor 106 when the vehicle is driven on an uphill road and provides the vehicle height information, e.g., the vehicle height to be raised at rear wheels and the vehicle height to be lowered at front wheels, determined in proportion to the calculated uphill slope to the suspension controller 300 via the interface unit 200. Since the suspension controller 300 controls the vehicle height control unit 305 according to the vehicle height to be raised at the rear wheels and the vehicle height to be lowered at the front wheels, it is possible to enhance the acceleration performance of the vehicle on an uphill road such as a hill or any other inclined surface. Here, the term "uphill slope" refers to an angle of upward inclination of an uphill road.

In addition, when the vehicle is driven on a downhill road, the braking controller 100 calculates a downhill slope using the longitudinal acceleration sensor 106 and then provides the vehicle height information, e.g., the vehicle height to be lowered at the rear wheels and the vehicle height to be raised at the front wheels, determined in proportion to the calculated slope of the downhill to the suspension controller 300 via the interface unit 200. Thus, since the suspension controller 300 controls the vehicle height control unit 305 according to the vehicle height to be lowered at the rear wheels and the vehicle height to be raised at the front wheels, it is possible to enhance the acceleration performance of the vehicle on a downhill road or any other declined surface.

In addition, the braking controller 100 determines whether the vehicle speed is changed or not when the vehicle is driven on an uneven road surface. As a result of the determination, if the vehicle speed is not changed and the number of revolutions of the wheel within a predetermined time exceeds a predetermined number of revolutions, the braking controller provides the vehicle height information, which is used to increase contact force between the wheel and the ground, to the suspension controller 300 via the interface unit 200. Accordingly, the acceleration performance of the vehicle can be enhanced on an uneven road surface such as a deep puddle on an unpaved road.

The suspension controller 300, which has received the vehicle height information from the braking controller 100 via the interface unit 200, controls the vehicle height control unit 305 to adjust the vehicle height in correspondence to the received vehicle height information.

The braking controller 100 illustrated in more detail for one embodiment with reference to FIG. 2. The braking controller 100 comprises a reception unit 100a, a calculating unit 100b, a determination unit 100c, a presuming unit 100d and a vehicle height information-providing unit 100e.

The reception unit 100a receives vehicle condition information from sensors installed in a vehicle, for example, the wheel speed sensors 101, the steering angle sensor 102, the brake pressure sensors 103, the yaw rate sensor 104, the lateral acceleration sensor 105 and the longitudinal acceleration sensor 106.

The calculating unit 100b calculates lateral acceleration using the vehicle speed and the steering angle received by the reception unit 100a.

The determination unit 100c determines a road surface condition on the basis of a difference between the lateral acceleration calculated by the calculating unit 100b and the lateral acceleration received by the reception unit 100a.

The presuming unit 100d presumes the roll angle on the basis of the road surface condition determined by the determination unit 100c and the lateral acceleration received by the reception unit 100a.

Referring to FIGS. 1 and 2, the vehicle height information-providing unit 100e provides the vehicle height information, which is determined on the basis of the roll angle presumed by the presuming unit 100d and the lateral acceleration received by the reception unit 100a, to the suspension controller 300 via the interface unit 200. Then, the vehicle height control unit 305 of the suspension controller 300 controls the vehicle height according to the vehicle height information received via the interface unit 200.

In addition, the vehicle height information-providing unit 100e provides the suspension controller 300 with the vehicle height information, which is determined to lower the height of an inner side of the vehicle with respect to a turning direction and to raise the height of an outer side of the vehicle with respect thereto in proportion to the lateral acceleration received by the reception unit 100a and the roll angle presumed by the presuming unit 100d.

The calculating unit 100b calculates an uphill slope using the longitudinal acceleration transmitted from the longitudinal acceleration sensor 106. Also, the calculating unit 100b calculates a downhill slope using the longitudinal acceleration transmitted from the longitudinal acceleration sensor 106.

The vehicle height information-providing unit 100e provides the vehicle height information, which is determined in proportion to the uphill slope calculated by the calculating unit 100b, e.g., the vehicle height to be raised at the rear wheels and the vehicle height to be lowered at the front wheels, to the suspension controller 300 via the interface unit 200.

Also, the vehicle height information-providing unit 100e provides the vehicle height information, which is determined in proportion to the downhill slope, e.g., the vehicle height to be lowered at the rear wheels and the vehicle height to be raised at the front wheels, to the suspension controller 300 via the interface unit 200.

In addition, the vehicle height information-providing unit 100e provides the vehicle height information, which is determined on the basis of the vehicle speed and the number of slip revolutions of the wheel and is to increase the contact force between the wheel and the ground, to the suspension controller 300 via the interface unit 200.

A control method of the vehicle height control apparatus so configured will be described as follows with reference to FIG. 3.

FIG. 3 is a flow chart for illustrating a control method of the vehicle height control apparatus according to one embodiment.

Referring to FIGS. 1, 2 and 3, the reception unit 100a of the braking controller 100 receives the vehicle condition information (S101). In other words, the reception unit 100a receives the vehicle condition information from the wheel speed sensors 101, the steering angle sensor 102, the brake pressure sensors 103, the yaw rate sensor 104 and the lateral acceleration sensor 105, which are connected to the barking controller 100. In addition, the reception unit 100a can receive the vehicle condition information, which is obtained by the vehicle height sensors 301, the vehicle height control switches 302, the door switches 303 and the reservoir pressure sensor 304 and transmitted from the suspension controller 300 through the interface unit 204.

Next, the calculating unit 100b of the braking controller 100 calculates the lateral acceleration using the vehicle speed and the steering angle measured by the steering angle sensor 102 (S103).

Then, the determination unit 100c of the braking controller 100 determines a road surface condition on the basis of the calculated lateral acceleration and the lateral acceleration measured from the vehicle, for example, the lateral acceleration measured by the lateral acceleration sensor 105 (S105).

Subsequently, the presuming unit 100d of the braking controller 100 presumes the roll angle on the basis of the determined road surface condition and the measured lateral acceleration (S107).

Then, the vehicle height information-providing unit 100e of the braking controller 100 determines the vehicle height information to be reflected in the suspension controller 300 on the basis of the presumed roll angle and the measured lateral acceleration (S109).

Next, the vehicle height information-providing unit 100e of the braking controller 100 provides the determined vehicle height information to the suspension controller 300 via the interface unit 200 (S111).

Then, the vehicle height control unit 305 of the suspension controller 300 controls the vehicle height according to the vehicle height information received from the braking controller 100 via the interface unit 200.

A control method of the vehicle height control apparatus when a vehicle is driven on an uphill road will be described for one embodiment as follows with reference to FIG. 4.

Referring to FIGS. 1, 2 and 4, the reception unit 100a of the braking controller 100 receives the longitudinal acceleration from the longitudinal acceleration sensor 106 (S201).

Subsequently, the calculating unit 100b of the braking controller 100 calculates an uphill slope using the received longitudinal acceleration (S203).

Next, the vehicle height information-providing unit 100e of the braking controller 100 determines the vehicle height information in proportion to the calculated uphill slope (S205). According to the determined vehicle height information, the vehicle height at the rear wheels is raised and the vehicle height at the front wheels is lowered.

Then, the vehicle height information-providing unit 100e of the braking controller 100 provides the determined vehicle height information to the suspension controller 300 via the interface unit 200 (S207). According to the vehicle height information received from the braking controller 100, for example, the vehicle height to be raised at the rear wheels and the vehicle height to be lowered at the front wheels, the suspension controller 300 controls the vehicle height, so that the acceleration performance of the vehicle can be enhanced when the vehicle is driven on an uphill road.

A control method of the vehicle height control apparatus when a vehicle is driven on a downhill road will be described for one embodiment as follows with reference to FIG. 5.

Referring to FIGS. 1, 2 and 5, the reception unit 100a of the braking controller 100 receives the longitudinal acceleration from the longitudinal acceleration sensor 106 (S301).

Subsequently, the calculating unit 100b of the braking controller 100 calculates a downhill slope using the received longitudinal acceleration (S303).

Next, the vehicle height information-providing unit 100e of the braking controller 100 determines the vehicle height information in proportion to the calculated downhill slope (S305). At this time, according to the determined vehicle height information, the vehicle height at the rear wheels is lowered and the vehicle height at the front wheels is raised.

Then, the vehicle height information-providing unit 100e of the braking controller 100 provides the determined vehicle height information to the suspension controller 300 via the interface unit 200 (S307). According to the vehicle height information received from the braking controller 100, for example, the vehicle height to be lowered at the rear wheels and the vehicle height to be raised at the front wheels, the suspension controller 300 controls the vehicle height, so that the acceleration performance of the vehicle can be enhanced when the vehicle is driven on a downhill road.

According to one aspect, a control method of the vehicle height control apparatus when a vehicle is driven on an uneven road surface such as a puddle on an unpaved road will be described as follows with reference to FIGS. 1, 2 and 6. First, the reception unit 100a of the braking controller 100 receives the wheel speed from the wheel speed sensor 101 (S401).

The calculating unit 100b of the braking controller 100 calculates the vehicle speed and the number of slip revolutions of the wheel using the received wheel speed (S403).

The determination unit 100c of the braking controller 100 determines whether the vehicle speed calculated by the calculating unit 100b is changed or not (S405).

As a result of the determination in step S405, if the vehicle speed is changed, the braking controller 100 allows the suspension controller 300 to control the vehicle height on the basis of the predetermined vehicle height information. At this time, the vehicle height control unit 305 of the suspension controller 300 controls the vehicle height so that the vehicle height received by the vehicle height sensors 301 is adjusted to the predetermined vehicle height.

As a result of the determination in step S405, if the vehicle speed is not changed, the determination unit 100c determines whether the number of slip revolutions of the wheel calculated by the calculating unit 100b exceeds a predetermined number of revolutions or not (S407).

As a result of the determination in step S407, if the number of slip revolutions of the wheel does not exceed the predetermined number of revolutions, the process proceeds to step S406 to allow the braking controller 100 to control the vehicle height.

As a result of the determination in step S407, if the number of slip revolutions of the wheel exceeds the predetermined number of revolutions, the braking controller 100 counts the time (S409).

Then, the determination unit 100c determines whether the counted time exceeds a predetermined time or not (S411).

As a result of the determination in step S411, if the counted time does not exceed the predetermined time, the process proceeds to step S405 and the braking controller 100 then determines whether the vehicle speed is changed or not.

As a result of the determination in step S411, if the counted time exceeds the predetermined time, that is, if the number of slip revolutions of the wheel exceeds the predetermined number of revolutions and the slip state is maintained for the predetermined time, the vehicle height information-providing unit 100e of the braking controller 100 provides the vehicle height information for increasing the contact force between the wheel and the ground to the suspension controller 300 via the interface unit 200. Accordingly, since the suspension controller 300 controls the vehicle height according to the vehicle height information received from the braking controller 100, the acceleration performance of the vehicle can be enhanced on an uneven road surface such as a puddle.

According to the embodiments of the present disclosure, the braking controller determines the vehicle height information in a cornering direction of a vehicle in proportion to the lateral acceleration measured by a lateral acceleration sensor and the roll angle and then provides the determined vehicle height information to the suspension unit via the interface unit. Thus, there is an effect in that it is possible to secure the roll stability of the vehicle and the steering stability.

Further, according to the embodiment of the present disclosure, the vehicle height information to be reflected in the suspension controller is determined in proportion to an uphill slope calculated using the longitudinal acceleration. Thus, there is also an effect in that the acceleration performance of the vehicle can be enhanced when the vehicle is driven on an uphill road.

Furthermore, according to the embodiment of the present disclosure, the vehicle height information to be reflected in the suspension controller is determined in proportion to a downhill slope calculated using the longitudinal acceleration. Accordingly, there is also an effect in that the acceleration performance of the vehicle can be enhanced when the vehicle is driven on a downhill road.

In additional, in a case where the vehicle speed is not changed and the number of slip revolutions of the wheel exceeds the predetermined number of revolutions while the slip state is maintained for a predetermined time, the vehicle height information to be reflected in the suspension controller for increasing the contact force between the wheel and the ground is determined. Thus, there is also an advantageous effect in that the acceleration performance of the vehicle can be enhanced on an uneven road surface such as a puddle.

The present disclosure is not limited to the embodiments described. It will be apparent that those skilled in the art can make various modifications and changes thereto. The modifications and changes fall in the spirit and scope of the present disclosure defined by the appended claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A vehicle height control apparatus, comprising:
   a suspension controller configured to control vehicle height; a lateral acceleration sensor;
   a braking controller configured to determine a road surface condition on the basis of a difference between a lateral acceleration measured by the lateral acceleration sensor and a lateral acceleration calculated using a vehicle speed value and a steering angle value, the braking controller determining vehicle height information to be reflected in the suspension controller on the basis of the measured lateral acceleration and a roll angle presumed on the basis of the determined road surface condition and the measured lateral acceleration; and
   an interface unit performing data communication between the braking controller and the suspension controller.

2. The apparatus as claimed in claim 1 wherein the braking controller provides the vehicle height information to the suspension controller via the interface unit, the vehicle height information being determined to lower the height at an inner side of a vehicle with respect to a vehicle turning direction and to raise the height at an outer side of the vehicle with respect thereto in proportion to the measured lateral acceleration and the presumed roll angle.

3. A vehicle height control apparatus, comprising:
   a suspension controller configured to control vehicle height; a longitudinal acceleration sensor;
   a braking controller configured to calculate an uphill or downhill slope using the longitudinal acceleration sensor, the braking controller determining vehicle height information to be reflected in the suspension controller in proportion to the calculated uphill or downhill slope; and
   an interface unit performing data communication between the braking controller and the suspension controller,
   wherein the vehicle height information to be reflected in the suspension controller allows the vehicle height at rear wheels to raise and the vehicle height at front wheels to lower when a vehicle is driven on an uphill road and allows the vehicle height at the rear wheels to lower and the vehicle height at the front wheels to raise when the vehicle is driven on a downhill road.

4. A vehicle height control apparatus, comprising:
   a suspension controller configured to control vehicle height;
   a braking controller configured to determine whether a vehicle speed is changed or not, and accordingly, determining vehicle height information to be reflected in the suspension controller so that contact force between a wheel and the ground is increased if the number of slip revolutions of the wheel exceeds a predetermined number of revolutions and a slip state is maintained for a certain time when the vehicle speed is not changed; and
   an interface unit performing data communication between the braking controller and the suspension controller.

5. A control method of a vehicle height control apparatus, which includes a braking controller, a suspension controller and an interface unit performing data communication between the braking controller and the suspension controller, the method comprising the steps of:
   calculating, by the braking controller, a lateral acceleration using a vehicle speed and a steering angle when a vehicle turns;
   determining, by the braking controller, a road surface condition on the basis of a difference between the calculated lateral acceleration and a lateral acceleration measured by a lateral acceleration sensor;
   presuming, by the braking controller, a roll angle on the basis of the determined road surface condition and the lateral acceleration measured by the lateral acceleration sensor;
   determining, by the braking controller, vehicle height information to be reflected in the suspension controller on the basis of the presumed roll angle and the lateral acceleration measured by the lateral acceleration sensor; and
   providing, by the braking controller, the determined vehicle height information to the suspension controller via the interface unit.

6. A control method of a vehicle height control apparatus, which includes a braking controller, a suspension controller and an interface unit performing data communication between the braking controller and the suspension controller, the method comprising the steps of:
   calculating, by the braking controller, an uphill or downhill slope using a longitudinal acceleration sensor when a vehicle is driven on a road having a slope;
   determining, by the braking controller, vehicle height information to be reflected in the suspension controller in proportion to the calculated uphill or downhill slope; and
   providing, by the braking controller, the determined vehicle height information to the suspension controller via the interface unit.

7. A control method of a vehicle height control apparatus, which includes a braking controller, a suspension controller and an interface unit performing data communication between the braking controller and the suspension controller, the method comprising the steps of:
   receiving a wheel speed from a wheel speed sensor when a vehicle wheel slips;
   calculating a vehicle speed and the number of slip revolutions of the wheel using the wheel speed;
   determining whether the calculated vehicle speed is changed or not; if the vehicle speed is not changed as a result of the vehicle speed change determining step, determining, by the braking controller, whether the calculated number of slip revolutions of the wheel exceeds a predetermined number of revolutions;

if the number of slip revolutions of the wheel exceeds the predetermined number of revolutions as a result of the slip revolution determining step, determining, by the braking controller, vehicle height information to be reflected in the suspension controller to increase contact force between the wheel and the ground; and providing, by the braking controller, the determined vehicle height information to the suspension controller via the interface unit.

8. The method as claimed in claim 7, before the step of determining the vehicle height information, further comprising the steps of:

if the number of slip revolutions of the wheel exceeds the predetermined number of revolutions, counting a time by the braking controller; and determining, by the braking controller, whether the counted time exceeds a certain time or not.

* * * * *